US005426515A

United States Patent [19]

Parker

[11] Patent Number: 5,426,515
[45] Date of Patent: Jun. 20, 1995

[54] LATERAL OVERFLOW GATE DRIVER CIRCUIT FOR LINEAR CCD SENSOR

[75] Inventor: Martin A. Parker, Penfield, N.Y.

[73] Assignee: Eastman Kodak Company, Rochester, N.Y.

[21] Appl. No.: 891,142

[22] Filed: Jun. 1, 1992

[51] Int. Cl.⁶ .......................... H04N 7/18; H03K 5/01
[52] U.S. Cl. ...................................... 358/483; 358/486; 327/111; 348/301; 348/308
[58] Field of Search ............. 358/483, 213.16, 213.31, 358/343, 342, 213.19, 213.11, 213.15, 213.26, 486; 348/301, 308; 327/111

[56] References Cited

U.S. PATENT DOCUMENTS

| 2,965,770 | 12/1960 | Lewinter | 307/88.5 |
|---|---|---|---|
| 3,364,365 | 1/1968 | Eisenhauer | 307/261 |
| 3,621,281 | 11/1971 | Hagen | 307/225 |
| 3,863,065 | 1/1975 | Kosonocky et al. | 250/211 J |
| 3,866,067 | 2/1975 | Amelio | 307/311 |
| 3,896,485 | 7/1975 | Early | 357/24 |
| 3,931,463 | 1/1976 | Levine | 178/7.1 |
| 3,931,465 | 1/1976 | Levine | 178/7.1 |
| 3,944,816 | 3/1976 | Harada | 250/211 |
| 3,953,733 | 4/1976 | Levine | 250/330 |
| 3,965,374 | 6/1976 | Peterson et al. | 307/318 |
| 4,301,477 | 11/1981 | Takemoto et al. | 358/213 |
| 4,471,228 | 9/1984 | Nishizawa | 250/578 |
| 4,472,744 | 9/1984 | Inoue et al. | 358/293 |
| 4,503,480 | 3/1985 | Pickard et al. | 361/152 |
| 4,549,215 | 10/1985 | Levine | 358/213 |
| 4,636,907 | 1/1987 | Howell | 361/13 |
| 4,731,665 | 3/1988 | Hashimoto et al. | 358/213.27 |
| 4,805,025 | 2/1989 | Akiyama et al. | 358/213.26 |
| 4,868,646 | 9/1989 | Tsuji | 358/98 |
| 4,879,470 | 11/1989 | Sugawa et al. | 250/578 |
| 4,912,537 | 3/1990 | Boyd | 357/30 |
| 5,047,660 | 9/1991 | Kannegundla et al. | 307/270 |
| 5,157,500 | 10/1992 | Gusmano | 358/213.15 |

FOREIGN PATENT DOCUMENTS

| 0486005A2 | 11/1991 | European Pat. Off. | H04N 3/15 |
|---|---|---|---|
| WO92/06564 | 4/1992 | WIPO | H04N 9/04 |

Primary Examiner—Paul Ip
Attorney, Agent, or Firm—James D. Leimbach

[57] ABSTRACT

Unwanted artifacts can occur in the output of a linear CCD sensor, caused by switching the exposure gate control voltage from a high level to a low lever to begin exposure while the device is reading out. A novel gate driver circuit for driving a lateral overflow gate of the CCD sensor provides a constant current path between the gate electrode and a low potential source. When a connection to a high potential source is opened to begin exposure, energy stored in a capacitance associated with the gate flows through the constant current path. This causes the gate voltage to move slowly and smoothly to the low potential and thus eliminates the unwanted artifacts.

5 Claims, 2 Drawing Sheets

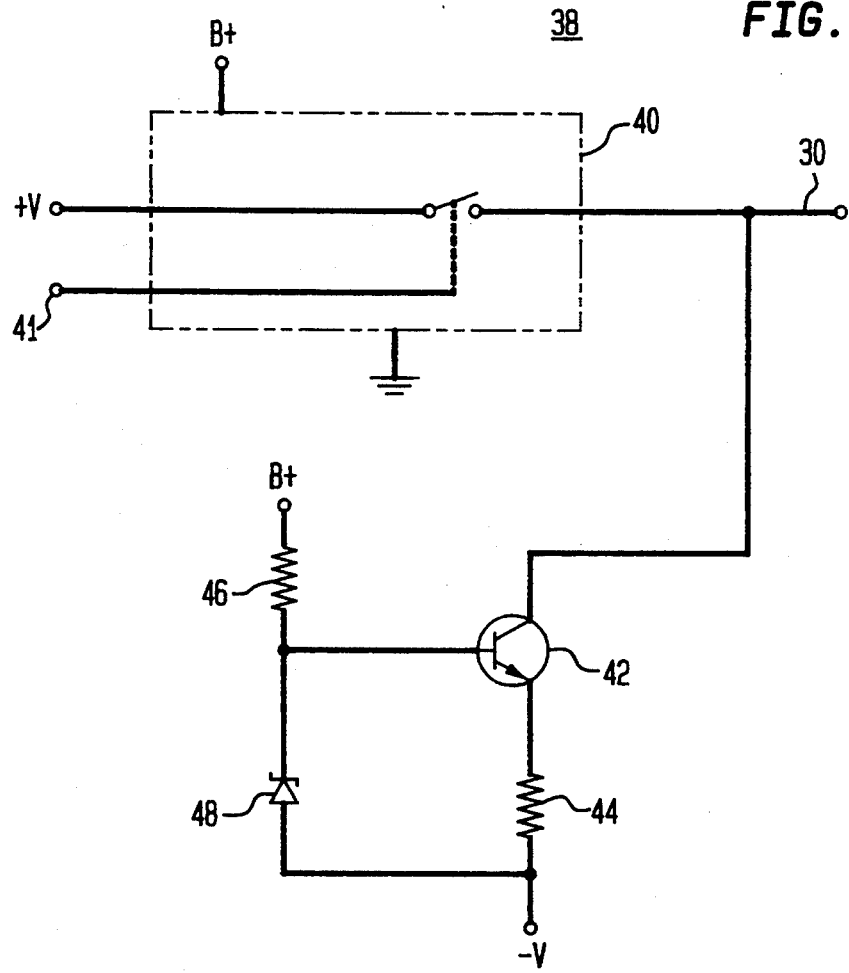

LATERAL OVERFLOW GATE DRIVER CIRCUIT FOR LINEAR CCD SENSOR

FIELD OF THE INVENTION

This invention relates to the field of image scanning and copying, and, particularly, to the operation and control driver circuits of linear charge coupled device (CCD) sensors which convert the photo information to electronic signals in such equipment.

BACKGROUND OF THE INVENTION

Many designs of scanning equipment make use of a linear CCD sensor which is basically a 1×n array of photocells coupled to an n cell shift register. For some applications such as film scanners, n may be several thousand photocells. For color reproduction, three independent 1×n arrays may be formed on a single die. Light from the illuminated subject is focused onto the line of photocells, which generate and accumulate charges in response thereto. The accumulated charges are then transferred into the respective cells of the shift register and read out one cell of pixel information at a time. If the object to be scanned is two dimensional, such as a photographic negative, there must be relative motion between the CCD sensor and the object, and the cycle of photo exposure, transferring and reading out repeats continually until the object is scanned. With a 4000 cell linear sensor providing 4000 pixel resolution across a 35 mm motion picture frame, comparable vertical resolution requires about 3000 lines, hence 3000 cycles. Rather than vary the scanning rate for exposure time control, it is more convenient to build into the CCD sensor a type of exposure gate, called a lateral overflow gate. When the gate is open, the charges generated by the photocells are continually drained off. When the gate electrode voltage is at a first level +V of about +3 to +8 volts, a "high voltage", all charges generated by the photocells are continually drained off. With the high voltage applied to the gate, the gate is defined as being fully open. As the gate electrode voltage is lowered, charges can accumulate to a maximum determined by the gate electrode voltage. Typically the voltage is lowered to a second level of −V, "a low voltage", of about 0 to −4 volts. At this second voltage level the gate is defined as being fully closed. The second level voltage −V determines the maximum allowed charge accumulation and may varied to control blooming in the image produced at the CCD sensor output.

In the interest of higher speed, it is usual to overlap the two time consuming parts of the cycle; while one line is being read out of the register, the next line is being generated by the photocells. As machines have gotten faster, a problem has arisen with respect to the lateral overflow gate. The gate electrode voltage normally rises to the fully open value during the period between lines when there is no output. When the gate electrode voltage is lowered to −V, the shift register is normally in the readout part of the cycle. Transients created by closing the gate tend to create an anomaly or "artifact" in the output. If the transient appears repeatedly at the same part of the cycle, streaks can appear on an output print.

There is a strong need, therefore, to eliminate the visible effects of closing the lateral overflow gate during register readout.

SUMMARY OF THE INVENTION

The lateral overflow gate driving circuit of the current invention comprises a first source of potential for keeping the gate fully open, a second source of potential for keeping the gate fully closed, current controlling means connected between the gate control electrode and the second source for limiting the amount of current that flows therebetween, and switching means responsive to switching signals for connecting the first source to the control electrode to open the gate and disconnecting the first source from the control electrode to close the gate.

The current controlling means, which may be a constant current circuit, provides a controlled path for the energy stored in the capacitance of the lateral overflow gate, to eliminate undesirable artifacts normally caused by switching transients.

Viewed from one aspect, the present invention is directed to a driver circuit for driving in response to a switching signal the control electrode of a lateral overflow gate of a CCD sensor. The driver circuit comprises a first source of potential for keeping said gate fully open, a second source of potential for keeping said gate fully closed, current controlling means, and switching means. The current controlling means is connected between the control electrode and the second source for limiting the amount of current that flows therebetween. The switching means is responsive to the switching signals for connecting the first source to the control electrode to open the gate and disconnecting the first source from the control electrode to close the gate.

Viewed from another aspect, the present invention is directed to a driver circuit for use with a charge coupled sensor and being coupled to a control electrode of a lateral overflow gate of the charge coupled sensor. The driver circuit comprises switching means and current controlled discharge means. The switching means is coupled between a first voltage reference terminal and the control electrode for selectively coupling the first voltage reference terminal to the control electrode. The current controlled discharge means is coupled between a second voltage reference terminal and the control electrode for selectively causing the control electrode to change in potential from a first voltage level, which is established when the first switching means couples the first reference voltage terminal to the gate electrode, to a second voltage level which occurs when the first reference voltage terminal is not coupled to the control electrode with the current controlled discharge means limiting current flow from the control electrode such that a transition from the first to the second voltage level occurs in a preselected period of time.

The invention will be better understood from the following more detailed description taken in conjunction with the accompanying drawings and claims.

BRIEF DESCRIPTION OF THE DRAWING

FIG. 3 is a driver circuit in accordance with the present invention for driving the lateral overflow gate of the CCD sensor of FIG. 1.

DETAILED DESCRIPTION

Figure 1:
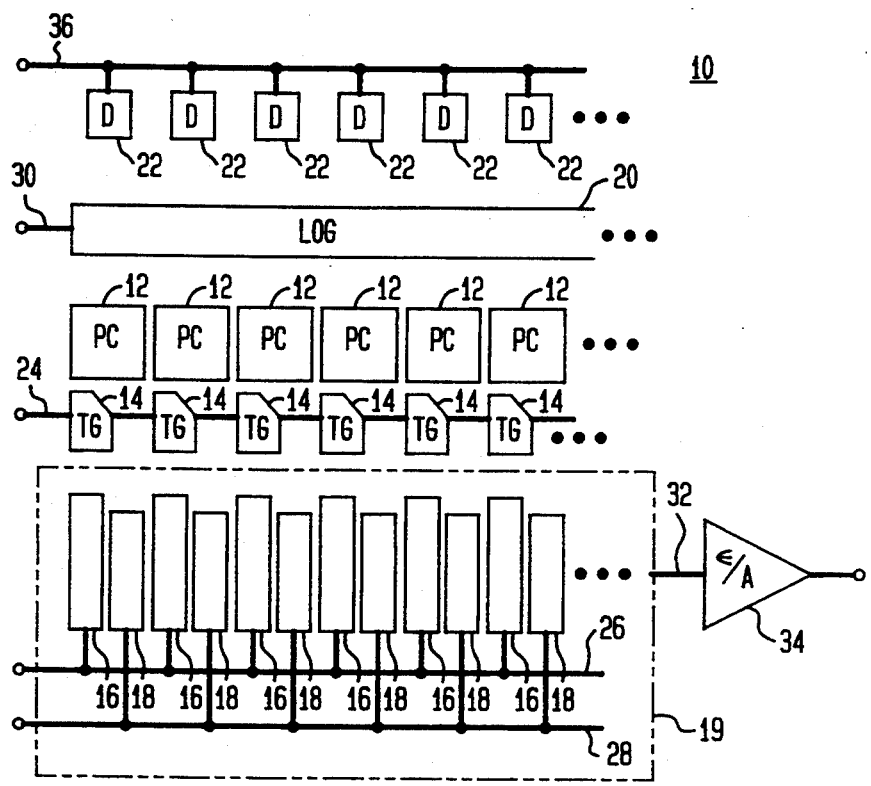
FIG. 1 is a partly schematic, partly pictorial representation of a linear CCD sensor to which the invention may be applied.

FIG. 1 illustrates some pertinent details of a linear CCD sensor 10 of a type to which the current invention may be applied. Sensor 10 has a row of individual photocells (PC) 12, of which only a few are shown for convenience, but which may number in the thousands. Adjacent each photocell 12 is a transfer gate (TG) 14, and adjacent each gate 14 are two phases, 16 and 18, respectively, of one cell of a shift register 19 (shown within a dashed line rectangle). Also adjacent the row of photocells 12 is a lateral overflow gate (LOG) 20, and adjacent LOG 20, for each photocell 12 there is a lateral overflow drain (D) 22. The above named parts, 12 through 22 each include a region in semiconductor material that is specially formulated to accumulate, move or store charge and an electrode to control the functions of the semiconductor regions. The electrodes, which are not shown, in general lie atop the specific regions, and are driven by externally applied electrical signals. Conductors 24, 26, 28 and 30, shown schematically, conduct the control signals for transfer gates 14, register phases 16 and 18, and lateral overflow gate 20, respectively. A conductor 32 conducts charges which represent the pixel information from shift register 19 to an electrometer and amplifier (E/A) 34, which is part of CCD sensor 10. E/A 34 has an output for further processing outside CCD sensor 10, and a conductor 36 conducts charges from overflow drains 22 for discarding into a power source (not shown).

A simplified description of the operation of CCD sensor 10 is as follows: Light focused from an object to be scanned falls on the photocells 12. Each photocell generates a charge that is proportional to the integral of the intensity of light it receives times the length of time over which the light is received, and stores the charges in the storage region below. Charges are moved when signals applied to the control electrodes change the electric fields within the respective controlled regions. In general, the charges move from a region with a less positive, or low control signal to an adjacent one with a more positive, or high control signal.

Figure 2:
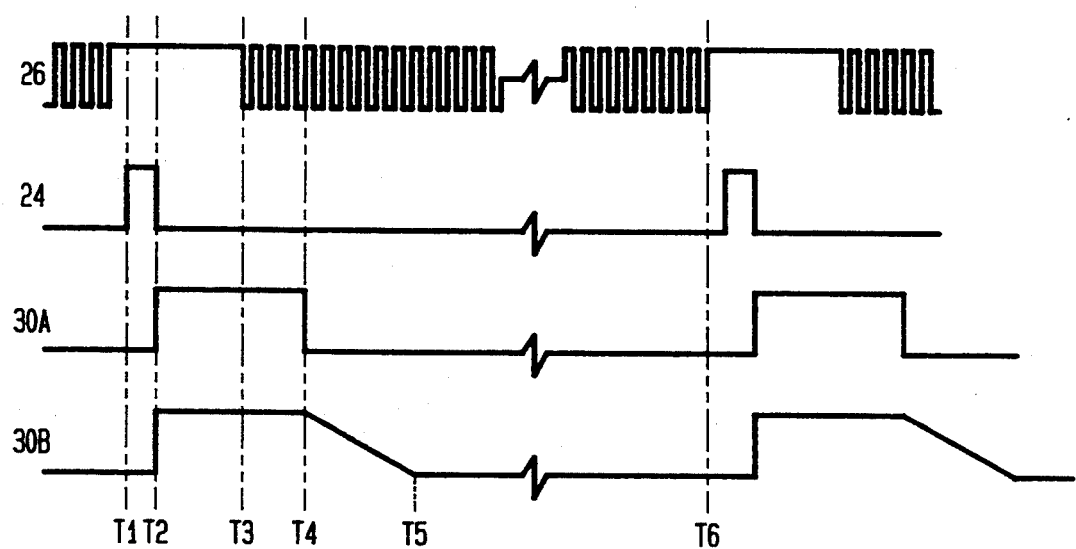
FIG. 2 is a timing diagram showing the relative timing and waveforms of various signals, including that produced by the invention, that drive the CCD sensor of FIG. 1.

Specific charge movement within CCD sensor 10 can be more clearly understood with reference to the timing diagram of FIG. 2, which shows some applied signals with a common time reference. The signals are labelled according to the conductors to which they are applied. Signal 26, therefore, controls regions 16 of shift register 19. Signal 28, which controls regions 18 of shift register 19, is not shown because it is the complement of signal 26. Signal 24 controls transfer gates 14, and signals 30 control lateral overflow gate 20. Signal 30A is the signal normally applied; signal 30B is the signal that is generated by a driver circuit 38 (shown in FIG. 3) which is described hereinbelow and which is in accordance with the present invention.

At a time T1, the period for integrating light and accumulating charge by photocells 12 expires, and signal 24 goes high. The field under the photocells being lower, the charge accumulated from each photocell, representing an individual pixel of an image, is caused to enter its respective associated transfer gate 14. At a time T2, shortly thereafter, signal 24 goes low. Since signal 26 is high, the charges transfer into respective regions 16 of the shift register. Also at the time T2, signal 30A goes high, driving lateral overflow gate 20 into the fully open condition. As long as signal 30A stays high, charges generated by photocells 12 are drained through gate 20 and drains 22, and, via conductor 36 to a power supply (not shown), where they are lost. At a time T3, signal 26 goes low, and its complement signal 28 goes high. This starts the register readout period. All the charges stored in shift register 19 are shifted to the right from regions 16 to regions 18. Signals 26 and 28 continue to cycle high and low, shifting the charges one register cell for each complete signal cycle, until the entire line of pixels has been read out. At a time T6, the register is empty and ready for another operating cycle.

In order for the photocells to accumulate charge, capturing a row of pixel information, the voltage on the lateral overflow gate electrode must be lowered at some time between times T2 and T6, depending on the length of exposure time desired. This occurs at a time T4 when signal 30A goes low. The gate is usually closed during the readout period which extends from time T3 to time T6. This is done during this period because the readout period takes up most of the operating cycle. This is where the problem occurs. Lateral overflow gate 20 presents a relatively large capacitance (not shown); the energy stored therein must be relocated (discharged) when the gate electrode goes low. A typical prior art gate driver switches the gate electrode precipitously from a stiff source of higher voltage to a stiff source of lower voltage. The energy stored in the gate capacitance rushes into the new source, creating a substantial short term transient effect. Since the various parts of the CCD sensor are coupled relatively closely, both capacitively and conductively, the transient effect is coupled throughout the CCD sensor. The most critical part is the electrometer and amplifier 34; if a cell reads out during the transient, it will give a false value to the respective pixel, creating an anomaly, or "artifact" in the image output. In older systems, this was not a significant problem. With a cell readout rate of 1 MHz., the shift register pulse duration was about 500 nanoseconds which is enough time for the transient to dampen out. At the higher readout rates of more recent designs, available shift register pulse duration times are much shorter. Readout rates as high as 10 MHz are now contemplated, with shift register driving pulses of only 50 nanoseconds duration. With the lateral overflow gate driver circuit 38 of the present invention, which is described hereinbelow and is shown in FIG. 3, the stored energy is relocated at a controlled constant rate, and the transient effect is virtually eliminated.

Referring now to FIG. 3, there is shown a driver circuit 38 in accordance with the present invention coupled to the conductor 30 of FIG. 1 that is connected to the control electrode of lateral overflow gate 20 of FIG. 1. Circuit 38 eliminates the above described unwanted transient effect and comprises an electronic switch 40 (shown within a dashed line rectangle) connected between a source of high driving voltage +V and the conductor 30 (also shown in FIG. 1), an n-p-n bipolar transistor 42, a zener diode 48, and resistors 44 and 46. The n-p-n transistor 42 has a base, an emitter and a collector. The zener diode 48 has an anode and a cathode.

A first terminal of switch 40 is coupled to a positive source of voltage +V and a second terminal of switch 40 is coupled to the line 30 and to the collector of transistor 42. A control input of switch 40 is coupled to a terminal 41. A first terminal of resistor 46 is coupled to a positive power supply having an output voltage level B+. A second terminal of resistor 46 is coupled to the base of transistor 42 and to the cathode of zener diode 48. The anode of zener diode 48 and the emitter of transistor 42 are coupled to a power supply having an output level −V. The B+ voltage level and a reference voltage level, shown as ground, are used to power switch 40.

The combination of transistor 42, resistors 44 and 46, and zener diode 48 function as an essentially constant current source. Zener diode 48 is operated in a reverse breakdown mode and thus a steady current flows from B+ through resistor 46 and zener diode 48. This establishes a constant voltage at the base of transistor 42 which is a voltage level of −V plus the breakdown voltage of the zener diode 48. The transistor 42 acts as an emitter follower and the base voltage is dropped by the emitter-base voltage (VBE) of transistor 42 and becomes the voltage appearing at the emitter of transistor 42. The difference between the emitter voltage and −V appears across resistor 44 and gives rise to a maximum current that may be drawn through the collector-emitter of transistor. Since transistor 42, zener diode 48, and resistors 44 and 46 act as a constant current source, the impedance looking into the collector of transistor 42 is high and thus voltage variations on line 30 essentially do not change the maximum current which can flow through transistor 42.

In operation, a timing signal similar in form to that of signal 30A is applied to control input 41. Referring now again to FIG. 2, at the time T2, switch 40 is closed. This provides a substantially direct connection between conductor 30 and +V to provide rapid turn-on of LOG 20. Since this occurs when register 19 of FIG. 1 is not reading out and the photocell-generated charges are not being accumulated, however, considerable transient can be tolerated without any effect on the scanner output. The constant current drain of transistor 42 is small and has no significant effect on the turn-on time. When the timing signal at the time T6 opens switch 40, however, the gate control electrode is not connected directly to source V−, but remains connected thereto only through transistor 42. The energy stored in the capacitance (not shown) of gate 20 is bled off at a constant rate through transistor 42 until there is not enough left to sustain the constant current. This causes a voltage profile at gate 20 electrode shown in FIG. 2 as waveform 30B. The result is almost no observable transient effect and elimination of artifacts in the scanner output signal.

The down ramp (i.e., the trailing edge of waveform 30B) may extend many cycles of register driving signal 26. As long as the gate electrode voltage drops fast enough to keep the maximum charge level rising faster than the photocell generated charge can accumulate, exposure accuracy is not affected. The slope of the down ramp depends on the capacitance of the gate as well as the value of emitter resistor 44, which is chosen according to the requirements of the scanning system in which the CCD sensor is used. Decreasing its value increases the transistor collector current, increasing the slope of the voltage down ramp and increasing the transient.

In a typical embodiment, B+ = +15 volts, +V = +3 to +8 volts, −V+0 to −4 volts, resistor 46 is 1,500 ohms, resistor 44 is approximately 10,000 ohms, the reverse breakdown voltage of zener diode 48 is 3.6 volts with zener diode being a IN4621, the rise time (10% to 90%) of waveform 30B between T1 and T2 is 50 nanoseconds, and the fall time (90% to 10%) of waveform 30B between T6 and T7 is 3 microseconds. The typical corresponding rise and fall times for waveform 30A are both 50 nanoseconds.

Suitable devices for electronic switch 40 are easily obtained. Siliconix, for example, markets a package identified as "Dual TTL controlled analog switch DG381A", which contains two such switches. In fact, electronic switch 40 may be replaced by a single field-effect transistor, depending on the range of voltages available at the device's terminals.

The preferred embodiment described provides substantially constant current through transistor 42 over a wide range of supply voltages. It further includes a degree of temperature compensation, in that voltage changes due to temperature changes of the transistor base-emitter junction are offset by those due to temperature changes in the zener diode junction. Obviously, a current controller that is less rigorous in providing a constant current will nonetheless provide considerable improvement and eliminate artifacts caused by exposure gate switching in many applications. Still other variations will occur to those skilled in this field, which do not depart from the spirit and scope of the invention as defined in the appended claims.

What is claimed is:

1. A driver circuit for driving in response to a switching signal a control electrode of a gate within a CCD sensor, the driver circuit comprising:
    a first source of potential for keeping said gate fully open;
    a second source of potential for keeping said gate fully closed;
    current controlling means connected between said control electrode and said second source for changing said control electrode potential from a first voltage level established while said gate is fully open to a second voltage level established while said gate is closed, such that change from said first voltage to said second voltage occurs in a ramp like manner; and
    switching means responsive to said switching signals for connecting said first source to said control electrode to open said gate and disconnecting said first source from said control electrode to close said gate.

2. The driver circuit of claim 1, wherein said current controlling means is a constant current regulating means.

3. The driver circuit of claim 2, wherein said constant current regulating means comprises:
    a transistor, having emitter, base and collector electrodes;
    resistance means connected in a series path with said collector and said emitter electrodes between said gate control electrode and said second source of potential; and
    voltage regulating means connected between said base electrode and said second source.

4. The driver circuit of claim 1, wherein said current controlling means comprises:
    a transistor having a collector electrode connected to said gate control electrode, an emitter electrode and a base electrode;
    a resistor connected between said emitter electrode and said second source of potential; and
    a reverse-biased zener diode connected between said base electrode and said second source of potential.

5. A driver circuit for use with a charge coupled sensor and being coupled to a control electrode of a gate within the charge coupled sensor, said driver circuit comprising:
   switching means coupled between a first voltage reference terminal and the control electrode for selectively coupling the first voltage reference terminal to the control electrode; and
   current controlled discharge means coupled between a second voltage reference terminal and the control electrode for selectively causing the control electrode to change in potential from a first voltage level, which is established when the first switching means couples the first reference voltage terminal to the gate electrode, to a second voltage level which occurs when the first reference voltage terminal is not coupled to the control electrode with the current controlled discharge means limiting current flow from the control electrode such that a transition from the first to the second voltage level occurs within a preselected period of time in a ramp like manner.

* * * * *